United States Patent [19]
Gaddis et al.

[11] Patent Number: 5,212,407
[45] Date of Patent: May 18, 1993

[54] DIGITAL PHASE MATCH DISCRIMINATOR FOR THREE-PHASE POWER

[75] Inventors: Dianne E. Gaddis, Manassas; Forrest K. Smith, Nokesville; Kirk J. Treubert, Fairfax, all of Va.

[73] Assignee: International Business Machines Corporation, Armonk, N.Y.

[21] Appl. No.: 592,748

[22] Filed: Oct. 4, 1990

[51] Int. Cl.$^5$ .............................. H02J 9/06; H02J 3/44
[52] U.S. Cl. .................................... 307/87; 307/127
[58] Field of Search .................. 307/19, 20, 23, 29, 307/43–48, 64–68, 70, 80, 85–87, 514, 516, 127; 361/76, 77, 84, 85, 185, 187; 364/483, 492; 340/658, 662, 825.7

[56] References Cited

U.S. PATENT DOCUMENTS

| | | | |
|---|---|---|---|
| 3,466,456 | 6/1966 | Tolworthy | 307/87 |
| 4,021,704 | 5/1977 | Norbeck | 361/77 |
| 4,218,625 | 8/1980 | Beckwith et al. | 307/87 |
| 4,308,465 | 12/1981 | Lafuze | 307/87 |
| 4,427,933 | 1/1984 | Wagener et al. | 318/711 |
| 4,499,534 | 2/1985 | Schnetzka et al. | 363/129 |
| 4,621,198 | 11/1986 | Roberge et al. | 307/82 |
| 4,677,264 | 5/1987 | Yamazaki et al. | 361/77 |
| 4,761,563 | 8/1988 | Ross et al. | 307/87 |
| 4,901,005 | 2/1990 | Shin et al. | 324/86 |
| 4,937,462 | 6/1990 | Recker et al. | 307/19 |

FOREIGN PATENT DOCUMENTS 0188638  1/1985  European Pat. Off. .

Primary Examiner—A. D. Pellinen
Assistant Examiner—David Osborn
Attorney, Agent, or Firm—Mark A. Wurm

[57] ABSTRACT

The resolution of two asynchronous three-phase power sources such that an optimal phase to phase matchup may be made between them. This is achieved with a logic system that receives a data point at the zero-voltage crossings of the three waveforms from each source. The data points create distinct "states" of the three-phase waveform for each power source. There are six data points for each power source per cycle. The states of the load and source, along with information pertaining to the connection configuration of the present source of power to the load, are used to determine the optimum configuration for connecting an alternate or new source to the load based on information obtained from a lookup table.

14 Claims, 9 Drawing Sheets

SOURCE

LOAD

SOURCE-TO-LOAD PATHS

FIG. 1

SOURCE-TO-LOAD PATHS

| LOAD PHASE AT TIME t (REFERENCE PHASE) | CLOSEST PHASE OF NEW SOURCE | | |
|---|---|---|---|
| | A | B | C |
| A | PATH 1 | PATH 3 | PATH 2 |
| B | PATH 2 | PATH 1 | PATH 3 |
| C | PATH 3 | PATH 2 | PATH 1 |

METHOD A

*FIG. 4a*

| PRESENT SOURCE PHASE (REFERENCE PHASE) | PRESENT PATH TO LOAD | | |
|---|---|---|---|
| | 1 | 2 | 3 |
| A | LOAD A | LOAD B | LOAD C |
| B | LOAD B | LOAD C | LOAD A |
| C | LOAD C | LOAD A | LOAD B |

METHOD B

| LOAD POLARITY | NEW SOURCE POLARITY | NEW PATH SELECT | LOAD POLARITY | NEW SOURCE POLARITY | NEW PATH SELECT |
|---|---|---|---|---|---|
| A B C | A B C | 1 0 | A B C | A B C | 0 1 |
| 0 0 0 | 0 0 0 | 0 0 | 1 0 0 | 0 0 0 | 0 0 |
| 0 0 0 | 0 0 1 | 0 0 | 1 0 0 | 0 0 1 | 1 0 |
| 0 0 0 | 0 1 0 | 0 0 | 1 0 0 | 0 1 0 | 1 1 |
| 0 0 0 | 0 1 1 | 0 0 | 1 0 0 | 0 1 1 | 1 0 |
| 0 0 0 | 1 0 0 | 0 0 | 1 0 0 | 1 0 0 | 0 1 |
| 0 0 0 | 1 0 1 | 0 0 | 1 0 0 | 1 0 1 | 0 1 |
| 0 0 0 | 1 1 0 | 0 0 | 1 0 0 | 1 1 0 | 1 1 |
| 0 0 0 | 1 1 1 | 0 0 | 1 0 0 | 1 1 1 | 0 0 |
| 0 0 1 | 0 0 0 | 0 0 | 1 0 1 | 0 0 0 | 0 0 |
| 0 0 1 | 0 0 1 | 0 1 | 1 0 1 | 0 0 1 | 0 1 |
| 0 0 1 | 0 1 0 | 1 0 | 1 0 1 | 0 1 0 | 1 0 |
| 0 0 1 | 0 1 1 | 0 1 | 1 0 1 | 0 1 1 | 1 0 |
| 0 0 1 | 1 0 0 | 1 1 | 1 0 1 | 1 0 0 | 1 1 |
| 0 0 1 | 1 0 1 | 1 1 | 1 0 1 | 1 0 1 | 0 1 |
| 0 0 1 | 1 1 0 | 1 0 | 1 0 1 | 1 1 0 | 1 1 |
| 0 0 1 | 1 1 1 | 0 0 | 1 0 1 | 1 1 1 | 0 0 |
| 0 1 0 | 0 0 0 | 0 0 | 1 1 0 | 0 0 0 | 0 0 |
| 0 1 0 | 0 0 1 | 1 1 | 1 1 0 | 0 0 1 | 1 0 |
| 0 1 0 | 0 1 0 | 0 1 | 1 1 0 | 0 1 0 | 1 1 |
| 0 1 0 | 0 1 1 | 1 1 | 1 1 0 | 0 1 1 | 1 1 |
| 0 1 0 | 1 0 0 | 1 0 | 1 1 0 | 1 0 0 | 0 1 |
| 0 1 0 | 1 0 1 | 1 0 | 1 1 0 | 1 0 1 | 1 0 |
| 0 1 0 | 1 1 0 | 0 1 | 1 1 0 | 1 1 0 | 0 1 |
| 0 1 0 | 1 1 1 | 0 0 | 1 1 0 | 1 1 1 | 0 0 |
| 0 1 1 | 0 0 0 | 0 0 | 1 1 1 | 0 0 0 | 0 0 |
| 0 1 1 | 0 0 1 | 1 1 | 1 1 1 | 0 0 1 | 0 0 |
| 0 1 1 | 0 1 0 | 0 1 | 1 1 1 | 0 1 0 | 0 0 |
| 0 1 1 | 0 1 1 | 0 1 | 1 1 1 | 0 1 1 | 0 0 |
| 0 1 1 | 1 0 0 | 1 0 | 1 1 1 | 1 0 0 | 0 0 |
| 0 1 1 | 1 0 1 | 1 1 | 1 1 1 | 1 0 1 | 0 0 |
| 0 1 1 | 1 1 0 | 1 0 | 1 1 1 | 1 1 0 | 0 0 |
| 0 1 1 | 1 1 1 | 0 0 | 1 1 1 | 1 1 1 | 0 0 |

NEW PATH SELECT DECODING:

00 : INVALID OUTPUT (NO NEW PATH)
01 : CONNECT SOURCE A TO LOAD A; B TO B; C TO C
10 : CONNECT SOURCE A TO LOAD B; B TO C; C TO A
11 : CONNECT SOURCE A TO LOAD C; B TO A; C TO B

*FIG. 7*

| PRESENT PATH | PRESENT SOURCE POLARITY | NEW SOURCE POLARITY | NEW PATH SELECT | PRESENT PATH | PRESENT SOURCE POLARITY | NEW SOURCE POLARITY | NEW PATH SELECT |
|---|---|---|---|---|---|---|---|
| 1 0 | A B C | A B C | 1 0 | 1 0 | A B C | A B C | 1 0 |
| 0 0 | 0 0 0 | 0 0 0 | 0 0 | 0 0 | 1 0 0 | 0 0 0 | 0 0 |
| 0 0 | 0 0 0 | 0 0 1 | 0 1 | 0 0 | 1 0 0 | 0 0 1 | 0 1 |
| 0 0 | 0 0 0 | 0 1 0 | 0 1 | 0 0 | 1 0 0 | 0 1 0 | 0 1 |
| 0 0 | 0 0 0 | 0 1 1 | 0 1 | 0 0 | 1 0 0 | 0 1 1 | 0 1 |
| 0 0 | 0 0 0 | 1 0 0 | 0 1 | 0 0 | 1 0 0 | 1 0 0 | 0 1 |
| 0 0 | 0 0 0 | 1 0 1 | 0 1 | 0 0 | 1 0 0 | 1 0 1 | 0 1 |
| 0 0 | 0 0 0 | 1 1 0 | 0 1 | 0 0 | 1 0 0 | 1 1 0 | 0 1 |
| 0 0 | 0 0 0 | 1 1 1 | 0 0 | 0 0 | 1 0 0 | 1 1 1 | 0 0 |
| 0 0 | 0 0 1 | 0 0 0 | 0 0 | 0 0 | 1 0 1 | 0 0 0 | 0 0 |
| 0 0 | 0 0 1 | 0 0 1 | 0 1 | 0 0 | 1 0 1 | 0 0 1 | 0 1 |
| 0 0 | 0 0 1 | 0 1 0 | 0 1 | 0 0 | 1 0 1 | 0 1 0 | 0 1 |
| 0 0 | 0 0 1 | 0 1 1 | 0 1 | 0 0 | 1 0 1 | 0 1 1 | 0 1 |
| 0 0 | 0 0 1 | 1 0 0 | 0 1 | 0 0 | 1 0 1 | 1 0 0 | 0 1 |
| 0 0 | 0 0 1 | 1 0 1 | 0 1 | 0 0 | 1 0 1 | 1 0 1 | 0 1 |
| 0 0 | 0 0 1 | 1 1 0 | 0 1 | 0 0 | 1 0 1 | 1 1 0 | 0 1 |
| 0 0 | 0 0 1 | 1 1 1 | 0 0 | 0 0 | 1 0 1 | 1 1 1 | 0 0 |
| 0 0 | 0 1 0 | 0 0 0 | 0 0 | 0 0 | 1 1 0 | 0 0 0 | 0 0 |
| 0 0 | 0 1 0 | 0 0 1 | 0 1 | 0 0 | 1 1 0 | 0 0 1 | 0 1 |
| 0 0 | 0 1 0 | 0 1 0 | 0 1 | 0 0 | 1 1 0 | 0 1 0 | 0 1 |
| 0 0 | 0 1 0 | 0 1 1 | 0 1 | 0 0 | 1 1 0 | 0 1 1 | 0 1 |
| 0 0 | 0 1 0 | 1 0 0 | 0 1 | 0 0 | 1 1 0 | 1 0 0 | 0 1 |
| 0 0 | 0 1 0 | 1 0 1 | 0 1 | 0 0 | 1 1 0 | 1 0 1 | 0 1 |
| 0 0 | 0 1 0 | 1 1 0 | 0 1 | 0 0 | 1 1 0 | 1 1 0 | 0 1 |
| 0 0 | 0 1 0 | 1 1 1 | 0 0 | 0 0 | 1 1 0 | 1 1 1 | 0 0 |
| 0 0 | 0 1 1 | 0 0 0 | 0 0 | 0 0 | 1 1 1 | 0 0 0 | 0 0 |
| 0 0 | 0 1 1 | 0 0 1 | 0 1 | 0 0 | 1 1 1 | 0 0 1 | 0 1 |
| 0 0 | 0 1 1 | 0 1 0 | 0 1 | 0 0 | 1 1 1 | 0 1 0 | 0 1 |
| 0 0 | 0 1 1 | 0 1 1 | 0 1 | 0 0 | 1 1 1 | 0 1 1 | 0 1 |
| 0 0 | 0 1 1 | 1 0 0 | 0 1 | 0 0 | 1 1 1 | 1 0 0 | 0 1 |
| 0 0 | 0 1 1 | 1 0 1 | 0 1 | 0 0 | 1 1 1 | 1 0 1 | 0 1 |
| 0 0 | 0 1 1 | 1 1 0 | 0 1 | 0 0 | 1 1 1 | 1 1 0 | 0 1 |
| 0 0 | 0 1 1 | 1 1 1 | 0 0 | 0 0 | 1 1 1 | 1 1 1 | 0 0 |

*FIG. 8a*

| PRESENT PATH | PRESENT SOURCE POLARITY | NEW SOURCE POLARITY | NEW PATH SELECT | PRESENT PATH | PRESENT SOURCE POLARITY | NEW SOURCE POLARITY | NEW PATH SELECT |
|---|---|---|---|---|---|---|---|
| 1 0 | A B C | A B C | 1 0 | 1 0 | A B C | A B C | 1 0 |
| 0 1 | 0 0 0 | 0 0 0 | 0 0 | 1 0 | 0 0 0 | 0 0 0 | 0 0 |
| 0 1 | 0 0 0 | 0 0 1 | 0 0 | 1 0 | 0 0 0 | 0 0 1 | 0 0 |
| 0 1 | 0 0 0 | 0 1 0 | 0 0 | 1 0 | 0 0 0 | 0 1 0 | 0 0 |
| 0 1 | 0 0 0 | 0 1 1 | 0 0 | 1 0 | 0 0 0 | 0 1 1 | 0 0 |
| 0 1 | 0 0 0 | 1 0 0 | 0 0 | 1 0 | 0 0 0 | 1 0 0 | 0 0 |
| 0 1 | 0 0 0 | 1 0 1 | 0 0 | 1 0 | 0 0 0 | 1 0 1 | 0 0 |
| 0 1 | 0 0 0 | 1 1 0 | 0 0 | 1 0 | 0 0 0 | 1 1 0 | 0 0 |
| 0 1 | 0 0 0 | 1 1 1 | 0 0 | 1 0 | 0 0 0 | 1 1 1 | 0 0 |
| 0 1 | 0 0 1 | 0 0 0 | 0 0 | 1 0 | 0 0 1 | 0 0 0 | 0 0 |
| 0 1 | 0 0 1 | 0 0 1 | 0 1 | 1 0 | 0 0 1 | 0 0 1 | 1 0 |
| 0 1 | 0 0 1 | 0 1 0 | 1 0 | 1 0 | 0 0 1 | 0 1 0 | 1 1 |
| 0 1 | 0 0 1 | 0 1 1 | 0 1 | 1 0 | 0 0 1 | 0 1 1 | 1 0 |
| 0 1 | 0 0 1 | 1 0 0 | 1 1 | 1 0 | 0 0 1 | 1 0 0 | 0 1 |
| 0 1 | 0 0 1 | 1 0 1 | 1 1 | 1 0 | 0 0 1 | 1 0 1 | 0 1 |
| 0 1 | 0 0 1 | 1 1 0 | 1 0 | 1 0 | 0 0 1 | 1 1 0 | 1 1 |
| 0 1 | 0 0 1 | 1 1 1 | 0 0 | 1 0 | 0 0 1 | 1 1 1 | 0 0 |
| 0 1 | 0 1 0 | 0 0 0 | 0 0 | 1 0 | 0 1 0 | 0 0 0 | 0 0 |
| 0 1 | 0 1 0 | 0 0 1 | 1 1 | 1 0 | 0 1 0 | 0 0 1 | 0 1 |
| 0 1 | 0 1 0 | 0 1 0 | 0 1 | 1 0 | 0 1 0 | 0 1 0 | 1 0 |
| 0 1 | 0 1 0 | 0 1 1 | 1 1 | 1 0 | 0 1 0 | 0 1 1 | 0 1 |
| 0 1 | 0 1 0 | 1 0 0 | 1 0 | 1 0 | 0 1 0 | 1 0 0 | 1 1 |
| 0 1 | 0 1 0 | 1 0 1 | 1 0 | 1 0 | 0 1 0 | 1 0 1 | 1 1 |
| 0 1 | 0 1 0 | 1 1 0 | 0 1 | 1 0 | 0 1 0 | 1 1 0 | 1 0 |
| 0 1 | 0 1 0 | 1 1 1 | 0 0 | 1 0 | 0 1 0 | 1 1 1 | 0 0 |
| 0 1 | 0 1 1 | 0 0 0 | 0 0 | 1 0 | 0 1 1 | 0 0 0 | 0 0 |
| 0 1 | 0 1 1 | 0 0 1 | 1 1 | 1 0 | 0 1 1 | 0 0 1 | 0 1 |
| 0 1 | 0 1 1 | 0 1 0 | 0 1 | 1 0 | 0 1 1 | 0 1 0 | 1 0 |
| 0 1 | 0 1 1 | 0 1 1 | 0 1 | 1 0 | 0 1 1 | 0 1 1 | 1 0 |
| 0 1 | 0 1 1 | 1 0 0 | 1 0 | 1 0 | 0 1 1 | 1 0 0 | 1 1 |
| 0 1 | 0 1 1 | 1 0 1 | 1 1 | 1 0 | 0 1 1 | 1 0 1 | 0 1 |
| 0 1 | 0 1 1 | 1 1 0 | 1 0 | 1 0 | 0 1 1 | 1 1 0 | 1 1 |
| 0 1 | 0 1 1 | 1 1 1 | 0 0 | 1 0 | 0 1 1 | 1 1 1 | 0 0 |
| 0 1 | 1 0 0 | 0 0 0 | 0 0 | 1 0 | 1 0 0 | 0 0 0 | 0 0 |
| 0 1 | 1 0 0 | 0 0 1 | 1 0 | 1 0 | 1 0 0 | 0 0 1 | 1 1 |
| 0 1 | 1 0 0 | 0 1 0 | 1 1 | 1 0 | 1 0 0 | 0 1 0 | 0 1 |
| 0 1 | 1 0 0 | 0 1 1 | 1 0 | 1 0 | 1 0 0 | 0 1 1 | 1 1 |
| 0 1 | 1 0 0 | 1 0 0 | 0 1 | 1 0 | 1 0 0 | 1 0 0 | 1 0 |
| 0 1 | 1 0 0 | 1 0 1 | 0 1 | 1 0 | 1 0 0 | 1 0 1 | 1 0 |
| 0 1 | 1 0 0 | 1 1 0 | 1 1 | 1 0 | 1 0 0 | 1 1 0 | 0 1 |
| 0 1 | 1 0 0 | 1 1 1 | 0 0 | 1 0 | 1 0 0 | 1 1 1 | 0 0 |
| 0 1 | 1 0 1 | 0 0 0 | 0 0 | 1 0 | 1 0 1 | 0 0 0 | 0 0 |
| 0 1 | 1 0 1 | 0 0 1 | 0 1 | 1 0 | 1 0 1 | 0 0 1 | 1 0 |
| 0 1 | 1 0 1 | 0 1 0 | 1 0 | 1 0 | 1 0 1 | 0 1 0 | 1 1 |
| 0 1 | 1 0 1 | 0 1 1 | 1 0 | 1 0 | 1 0 1 | 0 1 1 | 1 1 |
| 0 1 | 1 0 1 | 1 0 0 | 1 1 | 1 0 | 1 0 1 | 1 0 0 | 0 1 |
| 0 1 | 1 0 1 | 1 0 1 | 0 1 | 1 0 | 1 0 1 | 1 0 1 | 1 0 |
| 0 1 | 1 0 1 | 1 1 0 | 1 1 | 1 0 | 1 0 1 | 1 1 0 | 0 1 |
| 0 1 | 1 0 1 | 1 1 1 | 0 0 | 1 0 | 1 0 1 | 1 1 1 | 0 0 |
| 0 1 | 1 1 0 | 0 0 0 | 0 0 | 1 0 | 1 1 0 | 0 0 0 | 0 0 |
| 0 1 | 1 1 0 | 0 0 1 | 1 0 | 1 0 | 1 1 0 | 0 0 1 | 1 1 |

*FIG. 8b*

| PRESENT PATH | PRESENT SOURCE POLARITY | NEW SOURCE POLARITY | NEW PATH SELECT | PRESENT PATH | PRESENT SOURCE POLARITY | NEW SOURCE POLARITY | NEW PATH SELECT |
|---|---|---|---|---|---|---|---|
| 1 0 | A B C | A B C | 1 0 | 1 0 | A B C | A B C | 1 0 |
| 0 1 | 1 1 0 | 0 1 0 | 1 1 | 1 0 | 1 1 0 | 0 1 0 | 0 1 |
| 0 1 | 1 1 0 | 0 1 1 | 1 1 | 1 0 | 1 1 0 | 0 1 1 | 0 1 |
| 0 1 | 1 1 0 | 1 0 0 | 0 1 | 1 0 | 1 1 0 | 1 0 0 | 1 0 |
| 0 1 | 1 1 0 | 1 0 1 | 1 0 | 1 0 | 1 1 0 | 1 0 1 | 1 1 |
| 0 1 | 1 1 0 | 1 1 0 | 0 1 | 1 0 | 1 1 0 | 1 1 0 | 1 0 |
| 0 1 | 1 1 0 | 1 1 1 | 0 0 | 1 0 | 1 1 0 | 1 1 1 | 0 0 |
| 0 1 | 1 1 1 | 0 0 0 | 0 0 | 1 0 | 1 1 1 | 0 0 0 | 0 0 |
| 0 1 | 1 1 1 | 0 0 1 | 0 0 | 1 0 | 1 1 1 | 0 0 1 | 0 0 |
| 0 1 | 1 1 1 | 0 1 0 | 0 0 | 1 0 | 1 1 1 | 0 1 0 | 0 0 |
| 0 1 | 1 1 1 | 0 1 1 | 0 0 | 1 0 | 1 1 1 | 0 1 1 | 0 0 |
| 0 1 | 1 1 1 | 1 0 0 | 0 0 | 1 0 | 1 1 1 | 1 0 0 | 0 0 |
| 0 1 | 1 1 1 | 1 0 1 | 0 0 | 1 0 | 1 1 1 | 1 0 1 | 0 0 |
| 0 1 | 1 1 1 | 1 1 0 | 0 0 | 1 0 | 1 1 1 | 1 1 0 | 0 0 |
| 0 1 | 1 1 1 | 1 1 1 | 0 0 | 1 0 | 1 1 1 | 1 1 1 | 0 0 |
| 1 1 | 0 0 0 | 0 0 0 | 0 0 | 1 1 | 1 0 0 | 0 0 0 | 0 0 |
| 1 1 | 0 0 0 | 0 0 1 | 0 0 | 1 1 | 1 0 0 | 0 0 1 | 0 1 |
| 1 1 | 0 0 0 | 0 1 0 | 0 0 | 1 1 | 1 0 0 | 0 1 0 | 1 0 |
| 1 1 | 0 0 0 | 0 1 1 | 0 0 | 1 1 | 1 0 0 | 0 1 1 | 0 1 |
| 1 1 | 0 0 0 | 1 0 0 | 0 0 | 1 1 | 1 0 0 | 1 0 0 | 1 1 |
| 1 1 | 0 0 0 | 1 0 1 | 0 0 | 1 1 | 1 0 0 | 1 0 1 | 1 1 |
| 1 1 | 0 0 0 | 1 1 0 | 0 0 | 1 1 | 1 0 0 | 1 1 0 | 1 0 |
| 1 1 | 0 0 0 | 1 1 1 | 0 0 | 1 1 | 1 0 0 | 1 1 1 | 0 0 |
| 1 1 | 0 0 1 | 0 0 0 | 0 0 | 1 1 | 1 0 1 | 0 0 0 | 0 0 |
| 1 1 | 0 0 1 | 0 0 1 | 1 1 | 1 1 | 1 0 1 | 0 0 1 | 1 1 |
| 1 1 | 0 0 1 | 0 1 0 | 0 1 | 1 1 | 1 0 1 | 0 1 0 | 0 1 |
| 1 1 | 0 0 1 | 0 1 1 | 1 1 | 1 1 | 1 0 1 | 0 1 1 | 0 1 |
| 1 1 | 0 0 1 | 1 0 0 | 1 0 | 1 1 | 1 0 1 | 1 0 0 | 1 0 |
| 1 1 | 0 0 1 | 1 0 1 | 1 0 | 1 1 | 1 0 1 | 1 0 1 | 1 1 |
| 1 1 | 0 0 1 | 1 1 0 | 0 1 | 1 1 | 1 0 1 | 1 1 0 | 1 0 |
| 1 1 | 0 0 1 | 1 1 1 | 0 0 | 1 1 | 1 0 1 | 1 1 1 | 0 0 |
| 1 1 | 0 1 0 | 0 0 0 | 0 0 | 1 1 | 1 1 0 | 0 0 0 | 0 0 |
| 1 1 | 0 1 0 | 0 0 1 | 1 0 | 1 1 | 1 1 0 | 0 0 1 | 0 1 |
| 1 1 | 0 1 0 | 0 1 0 | 1 1 | 1 1 | 1 1 0 | 0 1 0 | 1 0 |
| 1 1 | 0 1 0 | 0 1 1 | 1 0 | 1 1 | 1 1 0 | 0 1 1 | 1 0 |
| 1 1 | 0 1 0 | 1 0 0 | 0 1 | 1 1 | 1 1 0 | 1 0 0 | 1 1 |
| 1 1 | 0 1 0 | 1 0 1 | 0 1 | 1 1 | 1 1 0 | 1 0 1 | 0 1 |
| 1 1 | 0 1 0 | 1 1 0 | 1 1 | 1 1 | 1 1 0 | 1 1 0 | 1 1 |
| 1 1 | 0 1 0 | 1 1 1 | 0 0 | 1 1 | 1 1 0 | 1 1 1 | 0 0 |
| 1 1 | 0 1 1 | 0 0 0 | 0 0 | 1 1 | 1 1 1 | 0 0 0 | 0 0 |
| 1 1 | 0 1 1 | 0 0 1 | 1 0 | 1 1 | 1 1 1 | 0 0 1 | 0 0 |
| 1 1 | 0 1 1 | 0 1 0 | 1 1 | 1 1 | 1 1 1 | 0 1 0 | 0 0 |
| 1 1 | 0 1 1 | 0 1 1 | 1 1 | 1 1 | 1 1 1 | 0 1 1 | 0 0 |
| 1 1 | 0 1 1 | 1 0 0 | 0 1 | 1 1 | 1 1 1 | 1 0 0 | 0 0 |
| 1 1 | 0 1 1 | 1 0 1 | 1 0 | 1 1 | 1 1 1 | 1 0 1 | 0 0 |
| 1 1 | 0 1 1 | 1 1 0 | 0 1 | 1 1 | 1 1 1 | 1 1 0 | 0 0 |
| 1 1 | 0 1 1 | 1 1 1 | 0 0 | 1 1 | 1 1 1 | 1 1 1 | 0 0 |

*FIG. 8c*

DIGITAL PHASE MATCH DISCRIMINATOR FOR THREE-PHASE POWER

BACKGROUND OF THE INVENTION

1. Technical Field

The invention disclosed broadly relates to the switching of multi-phase electrical power sources, and more particularly, relates to the precise matching of the relative phases in a multi-phase system for switching between power sources.

2. Background Art

Figure 1:
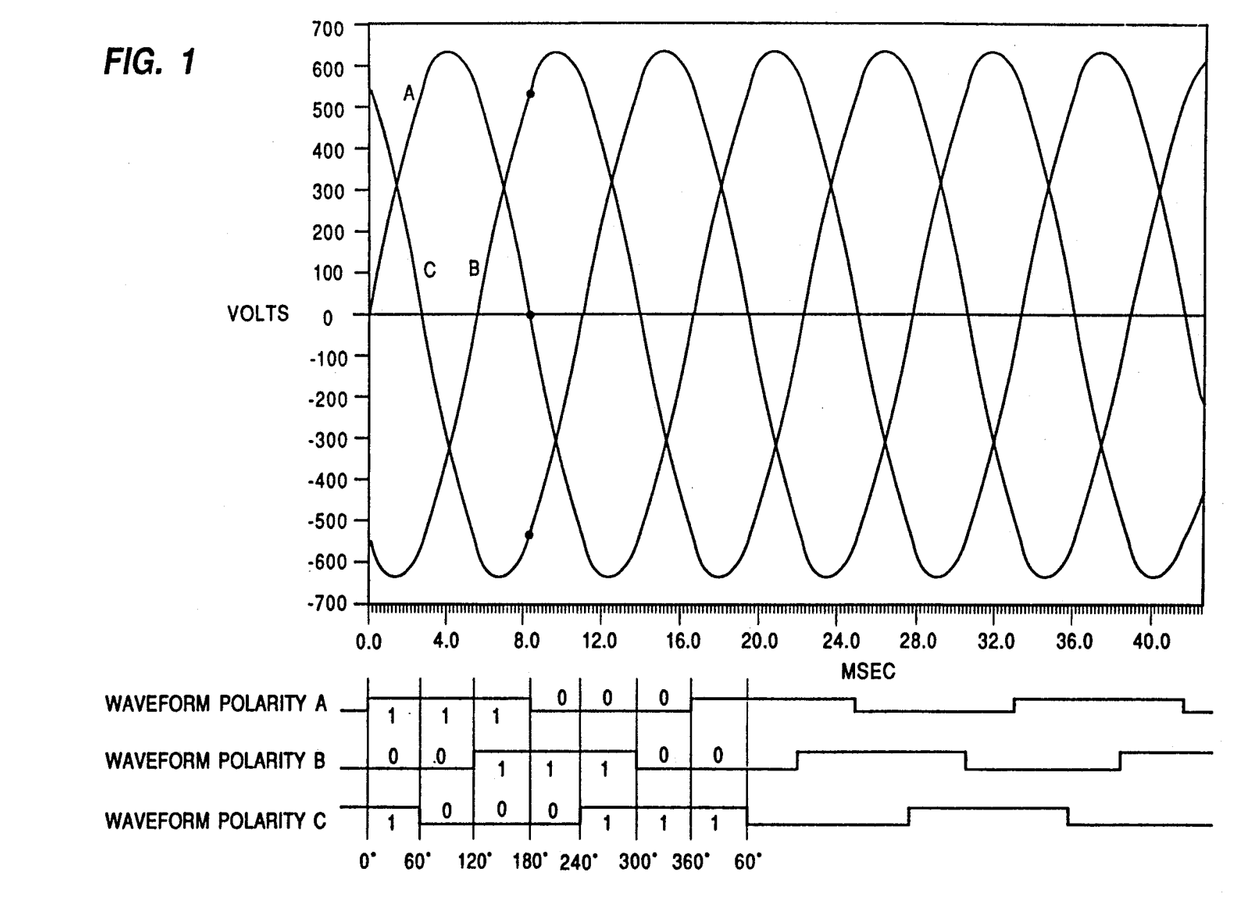
FIG. 1 is a waveform diagram of a three-phase power system illustrating the voltage of phases A, B and C.

Delta power systems and some unreferenced Y power systems are commonly used in power generation and distribution networks. These are normally three-phase power sources. The voltage waveforms of a three-phrase power system are shown in FIG. 1. Conventionally, three-phase voltage waveforms are represented by Phase A, Phase B and Phase C, which are generated so as to be 120 degrees in phase separation, respectively. The measurement of the relative phase relation between two sources in a multi-phase system is important in power switching control applications. For references to the U.S. Pat. No. 4,761,563 to Ross and Woodworth, entitled "Asynchronous Multi-Phase Switching Gear," wherein FIG. 1 shows a schematic of a functional block diagram of the system wherein a closely matched phase rotation detection unit and a coincidence detector are used when switching from one power source to an asynchronous second source. The devices most closely match the phase of the load to the second power source. The invention provides the input to the control unit as to the best load matching. By closely matching each phase of the load to the phase of the second source which is nearest in phase alignment, a near synchronous transfer of three-phase power from the first power source to the second power source can be made with minimum disruption to the load.

Figure 2:
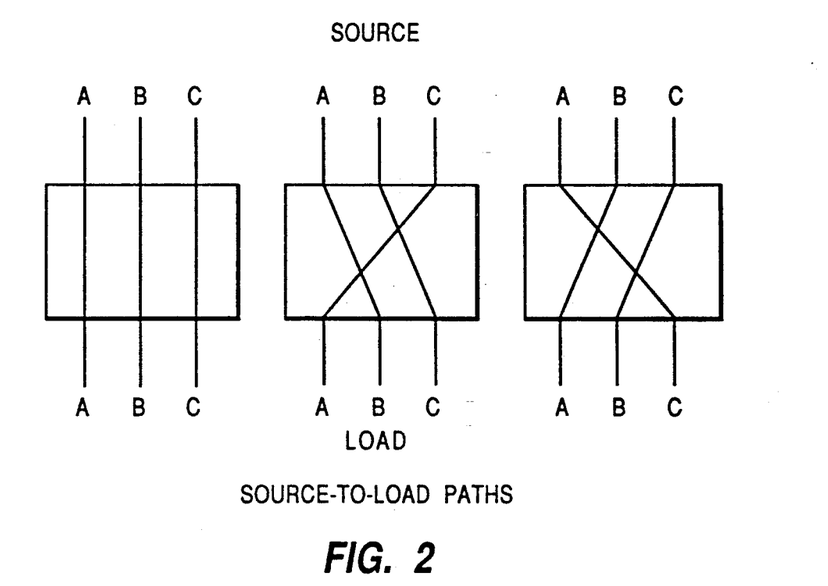
FIG. 2 is a diagram showing the three possible matchups between the source and the load.
Figure 3:
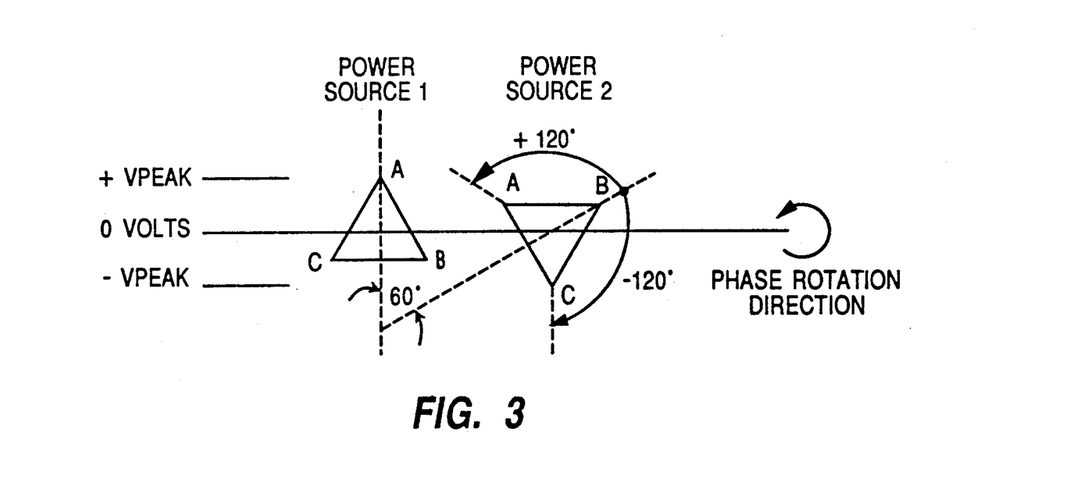
FIG. 3 is a diagram that shows the phase rotation and phase matching between the load and "new" power source with a 60 degree phase displacement between the load and the sources illustrated.

To implement an asynchronous multi-phase switching method it is necessary to resolve the relative phases of two asynchronous three-phase power sources such that an optimal phase to phase matchup may be made between them. Matchup in this case is defined as finding, for each phase (commonly labeled A, B or C) of the load, that phase of the second source which is closest in time (phase angle). There are only three possibilities as shown in FIG. 2 for matchups which fit the criterion of preserving the phase rotation direction. Phase rotation direction for this disclosure will always be taken to be to A to B to C, The problem demonstrates that given typical power sources with three phases at 120 degrees to each other, this "best of three" matchup yields a theoretical worst case angular discontinuity of 60 degrees. This is shown in FIG. 3. Note that the matchup must occur between the load and the "new" source. It is possible to monitor only the present and new source voltage polarities, however the solution must then include information about what the connection configuration is (1 of 3) between the present source and load. This configuration is called the "present path."

The problem, then, is to establish real time knowledge of the angle of rotation of the required waveforms of sufficient accuracy to calculate the best of three matchups with a tolerable worst case error. Error is due to the difference in source frequencies and source waveform sampling rate. This can be achieved with a logic system that receives as data the zero-voltage crossing of the three waveforms from each source or from the load and the "new" source.

OBJECTS OF THE INVENTION

It is therefore an object of the invention to provide a means to identify the best of three matchups within the three-phases of a poly-phase power system to allow a smooth transfer of power from one power source to another.

It is another object of the invention to provide a source-matching angular tolerance of plus or minus 60 degrees of phase for a three-phase multi-source system to allow a load to be switched between power sources with minimum disruption.

SUMMARY OF THE INVENTION

These and other objects, features and advantages of the invention are accomplished by a digital phase match discriminator for three-phase power systems as disclosed herein. The invention includes a "polarity change detector" which detects any change of polarity in any of the three phases of the present power source or the load. A "logic network" produces outputs based on the inputs provided from the load and the new source or from both sources and the present source-to-load configuration. The logic network outputs and derived from a known lookup table. The output from the logic network is latched by a sampling clock derived from the "polarity change detector" circuit. The output of the latch provides the best phase-matching solution at any given time.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

FIG. 1 shows three phases, A, B and C for a three-phase power system. The three phases of the power system are 120 degrees apart. As phase A goes through zero, phases B and C are equal and opposite. This zero-voltage cross-over detection scheme is disclosed in U.S. Pat. No. 4,901,005 to Shin and Woodworth, entitled "Zero Voltage Crossover Detector for Poly-Phase Systems" wherein a scheme for detecting zero crossing of one phase of a three-phase power supply is disclosed. In the lower portion of FIG. 1 are shown the waveform polarities A, B and C.

These three waveforms depict six different possibilities or states of the phases. There are six unique states in a single cycle with respect to the relative polarity of the three phases. These six states are: (A+, B−, C+); (A+, B−, C−); (A+, B+, C−); (A−, B+, C−); (A−, B+, C+); and (A−, B−, C+). In this notation plus and minus refer to the polarity of the phase voltage with respect to neutral. That is, either positive or negative.

The problem is to resolve the relative phases of an asynchronous, three-phase power source and a load driven by a second, similar source, such that an optimal phase to phase matchup can be made between them while preserving the phase rotation direction. The matchup in this case is defined as finding, for each phase commonly labeled A, B and C, of the load that phase of the second or "new" source which is closest in phase angle. There are only three possibilities as shown in FIG. 2 of matchup which fits the criterion of preserving the phase rotation direction. Analysis of the problem demonstrates that given typical power sources with three-phases at 120 degrees with respect to each other, the best of three matchups yield a theoretical worst case angular discontinuity of 60 degrees.

The problem then is to establish real time knowledge of the angular rotation and the required waveforms with sufficient accuracy to calculate the best of three matchups with a tolerable worst case error. This can be achieved with a logic system that receives a data point and a zero voltage crossing of the three waveforms from each source or from the load and the "new" source. This phase matchup can be seen in FIG. 3, wherein the power source 1 has its A Phase at peak voltage and power source 2 has its A Phase 60 degrees advanced from power source 1. The theoretical 60 degree angular misalignment shown is the worst case possible.

Figure 4A:
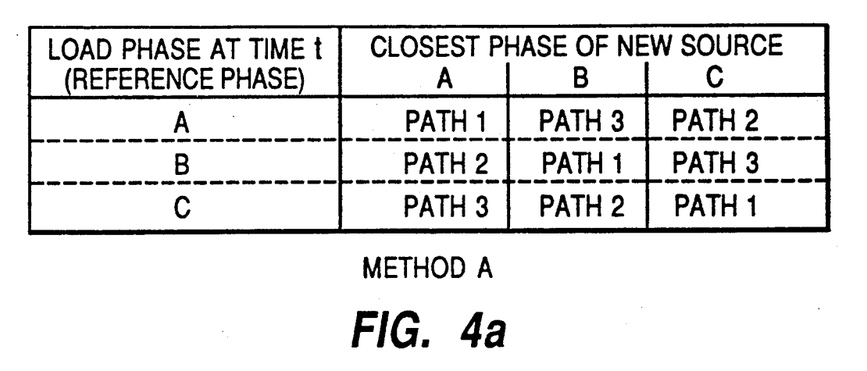
FIG. 4a is a truth table of load versus closest new source path showing the basis of the lookup table when choosing the best matchup between the load and the new source.

FIG. 4a shows a truth table for the connection of the load to the new source based on the polarities it derived from the load and new source waveforms for the six different states as shown in FIG. 1. Only three available paths are allowable for connecting the new source to the load. That is, A to A, A to B, or A to C with the phase of the new source matching the corresponding phase of the load.

To choose the best-of-three solution set (new path) for an asynchronous transfer between sources, first: at the moment in time when the transfer is to be initiated, note the angular location of where any phase of the load is at a positive peak (or any other convenient point on the voltage wave). This is the reference point. Note which phase (A, B or C) is the reference and select that row in the truth table. Next, find the voltage phase of the new source which is most closely aligned with the reference point (phases A, B or C). Note the new source phase and select that column in the truth table. The intersection of the row and column selected is the new path which should be used. This method is called "method A." New path 1 connects new source phase A to load A, source B to load B and source C to load C. New path 2 connects source A to load B, source B to load C, and source C to load A. New path 3 connects source A to load C, source B to load A and source C to load B.

Figure 4B:
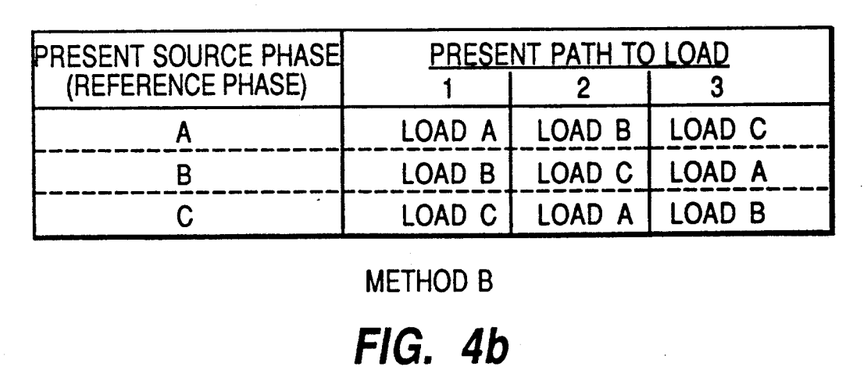
FIG. 4b is a truth table of present source versus present path to load showing the basis of the lookup table when choosing the best matchup source to load knowing both source voltage polarities.

When the voltage polarities of both sources are used to determine the new path, the path from the present source to the load must be known in order to determine the new path. FIG. 4b shows a truth table for the connection of the load to new source using both source voltage polarities to find the new path. To use the translation truth table, note the angular location of where a phase of the present source is at a positive peak, or at any other convenient reference point. Knowing which phase it is (A, B or C), select the appropriate row in the translation table. Then note the present path (1, 2 or 3) being used and select the appropriate column in the table. The intersection of the row and column selected is the load phase which should be used in the "new path" truth table of FIG. 4a. This method is called "method B."

Figure 5A:
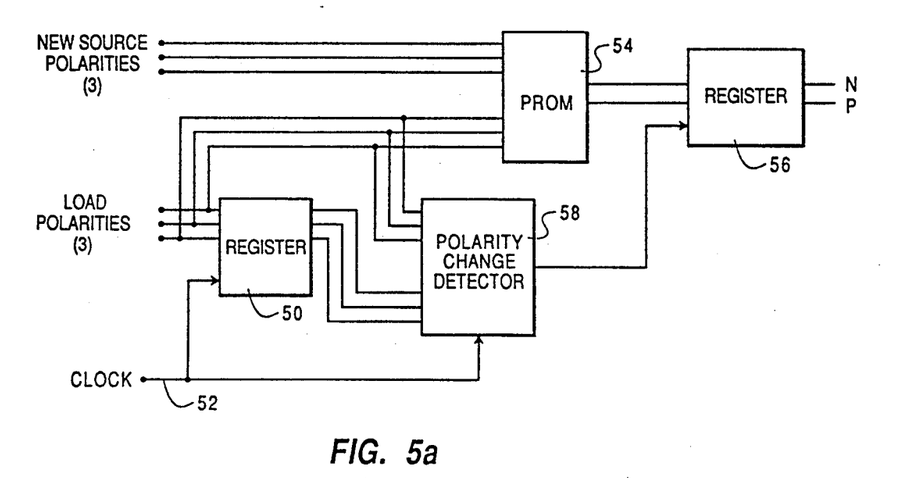
FIG. 5a is a schematic of a circuit to implement the invention using load and new source voltage polarity signals.

Shown in FIG. 5a is an embodiment of the present invention for the circuit which analyzes the angular position of an asynchronous alternating current (AC) three-phase voltage source and the load. The circuit provides an output based upon the angular displacement of the new source and load (method A). The output is used to select one connection path from a set of three available connection paths which would allow a transfer of power from the present source to the new source with an angular shift at the electrical load of no more than 60 electrical degrees. Element 50 is a register. Element 58 detects a change of voltage polarity on any of the three load phases. A change of voltage polarity represents a transition from a positive voltage to a negative voltage, or from a negative voltage to a positive voltage. (Either the present source or load may be used as the input to the polarity change detector; for the purpose of this discussion, the load is used.) sampling clock 52 is used to latch the state of the load polarities into the storage device register 50. This creates a history of the load polarities at the output of the register. The history has a maximum time lapse equal to the time period of the sampling clock. Element 58 compares a history of each phase polarity to the corresponding real time phase polarity. If any real time phase polarity is not equivalent to its corresponding history value, a change in polarity output is generated. PROM element 54 analyzes the angular displacement dynamics of the asynchronous source and the load and calculates which matrix connection of the new source to the load will cause the least amount of angular shift of the load if the source of power to the load were to switch from the present source to the new source. PROM 54 is a logic network which updates its output whenever its inputs change.

The inputs to PROM 54 consist of either the load and new source polarities or the present and new source polarities and the "present path." The present path describes the matrix connection of the present source to the load. For example, if source phase A is connected to load phase A, source B to load B, and source C to load C, this is one connection. If source phase A is connected to load phase B, source B to load C and source C to load A, this a second possible connection. The third connection exists when source A connects to load C, source B to load A and source C to load B. The present path describes which of these three connections are being used to provide power to the load from the present source.

An assumption is made that the load is synchronized with the present source. If the PROM is using the source polarities and the present path, where the matrix connection of the present source of the load is known to the PROM 54, then changes in the present source voltage polarity are analogous to changes in the load voltage polarity. PROM 54 continuously monitors the three-phase polarities of the source or load waveforms and calculates a new path which yields the best alignment of phases between the new source and the load. The output of PROM 54 is the new phase match path, or "new path.".

Register 56 is a latching device which latches a new path output from PROM 54 in a storage device at moments of time controlled by the output of element 58, or when a change of polarity is detected in any phase of the load. This means that on average the "new path" is latched every 60 electrical degrees with respect to the load. The new path is latched after every change of load polarity for the following reason: When a change in any phase polarity is detected for the load the angular position of the three-phase load is exactly known. Monitoring the load polarity is an efficient, accurate method for determining the actual angular position of the load voltage. The accuracy of the position of the load is subject only to the delays associated with detecting and reporting the change in the polarity. This time delay has a small effect on the accuracy of the circuit output in the form of an implementation dependent error factor. This sampling method is valid regardless of which source whether the present source or load is monitored for polarity changes.

Figure 5B:
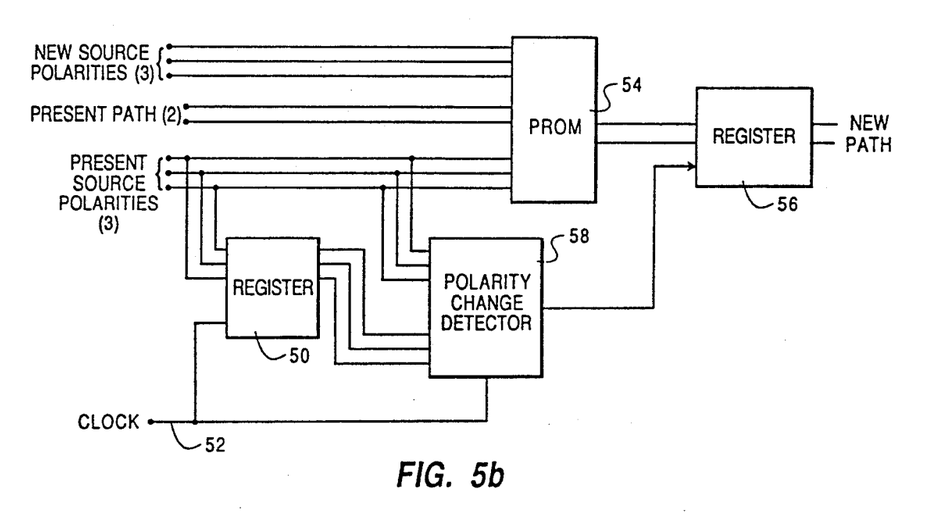
FIG. 5b is a schematic of a circuit to implement the invention knowing both present and new source voltage polarities.

The circuit described allows an external power transfer control circuit to transfer power to an electrical load from an AC power source to another asynchronous AC power source with a maximum angular displacement at the load of 60 electrical degrees. The circuit may use information about the present connection path of a source to a load along with information about the voltage polarities of both the source which is powering the load at a defined time and a source which is available to provide power to the load. Alternately, the circuit may utilize new source and load voltage polarity information. The circuit calculates which connection path between the new source and the load should be selected to allow a transfer of power from the present source to the new source to occur with an angular shift on the load of no more than 60 electrical degrees. A block diagram of an embodiment of the invention using voltage polarity signals from both power sources and the present path to the load is shown in FIG. 5b. It operates in the same manner as the circuit as described in relation to FIG. 5a with the addition of "present path" signals to the PROM 54.

Figure 6:
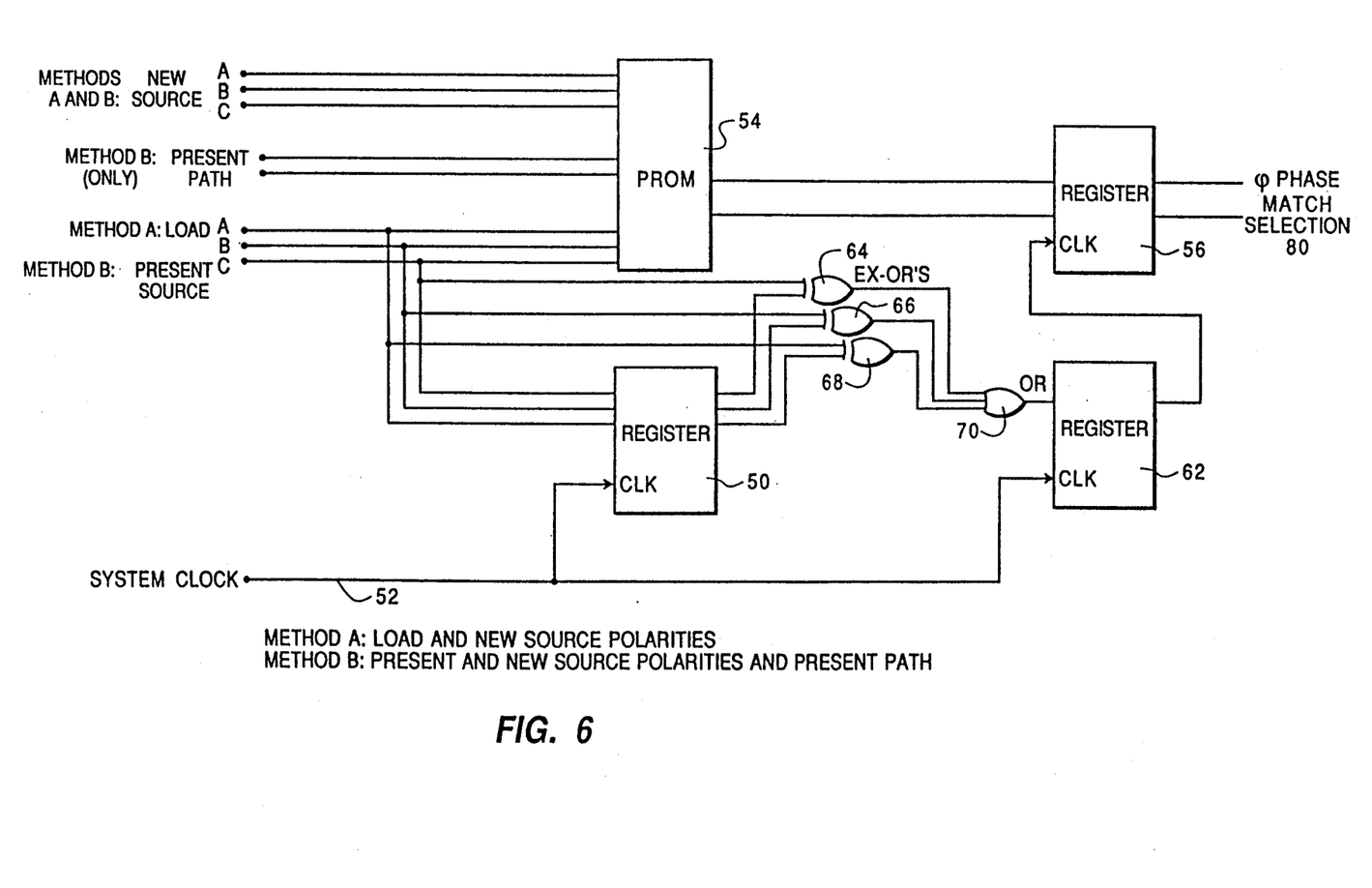
FIG. 6 is a specific circuit for implementing the invention of FIGS. 5a and b.

The polarity change detector 58 shown in FIGS. 5a and b can be realized in the embodiment as shown in FIG. 6. Register 50 is connected to the sample clock 52 and receives the present source or load waveform polarities. Register 50 outputs delayed signals to a set of exclusive OR gates. Exclusive OR gates 64, 66 and 68 provide a logically "true" signal when the waveform has changed state. When any of the polarities have changed state, a "logically true" is produced at the output of the OR gate 70. Register 62 outputs its signal to output register 56 to latch the new path 80 which is valid until the next change of polarity is detected. Both method A and method B implementations are shown in FIG. 6.

Figure 7:
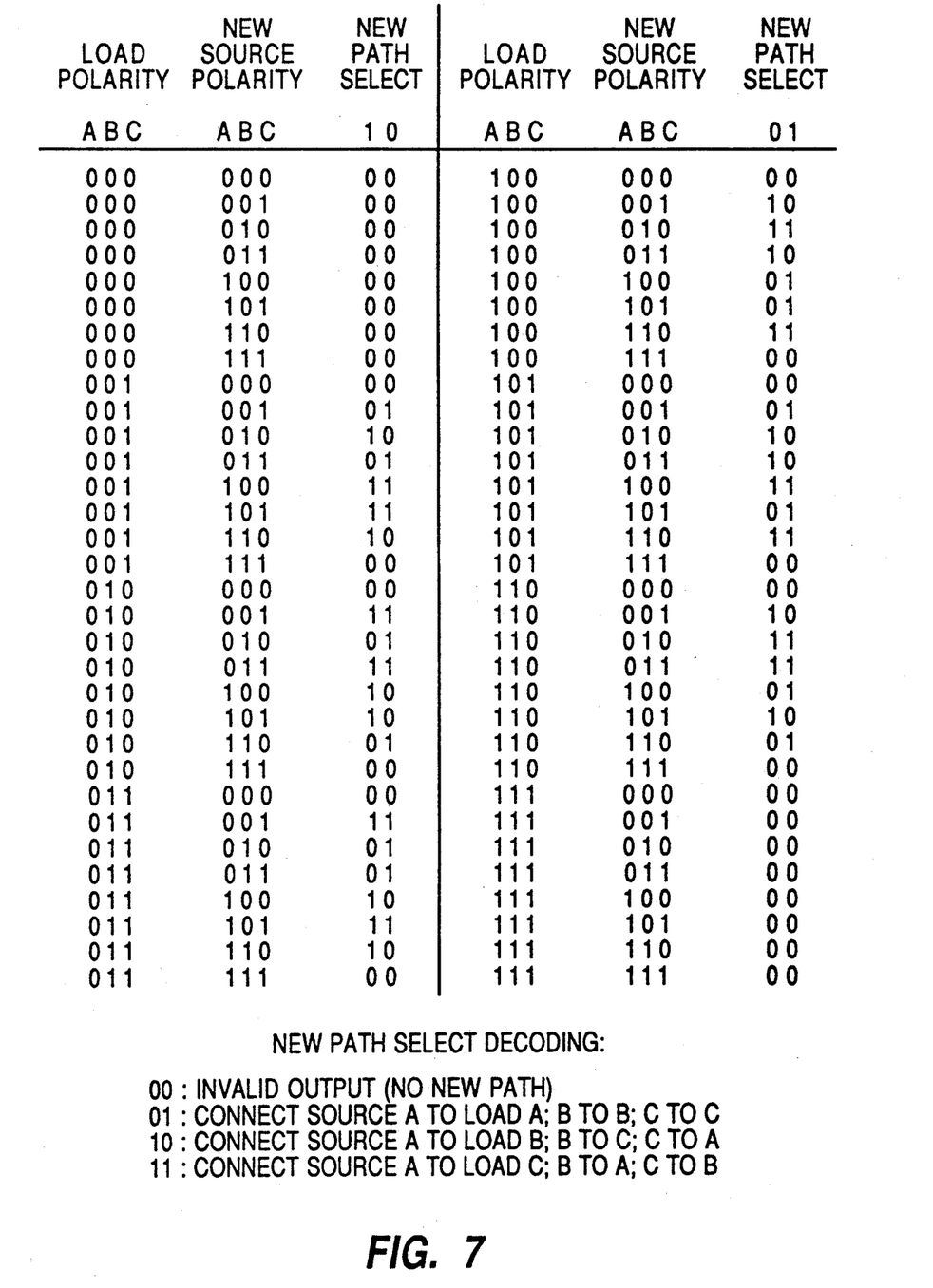
FIG. 7 shows a PROM lookup table for the circuit of FIG. 6 using method A.
Figure 8A:
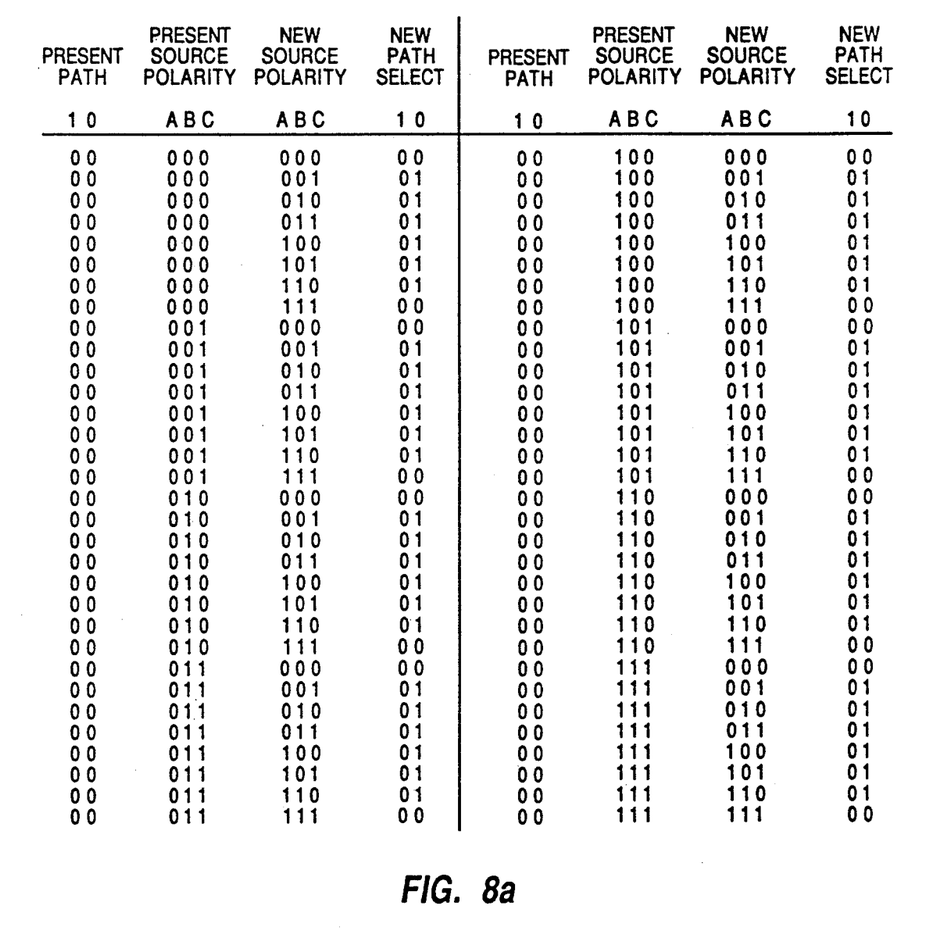
FIGS. 8a, b, c show a PROM lookup table for the circuit of FIG. 6 using method B.
Figure 8C:
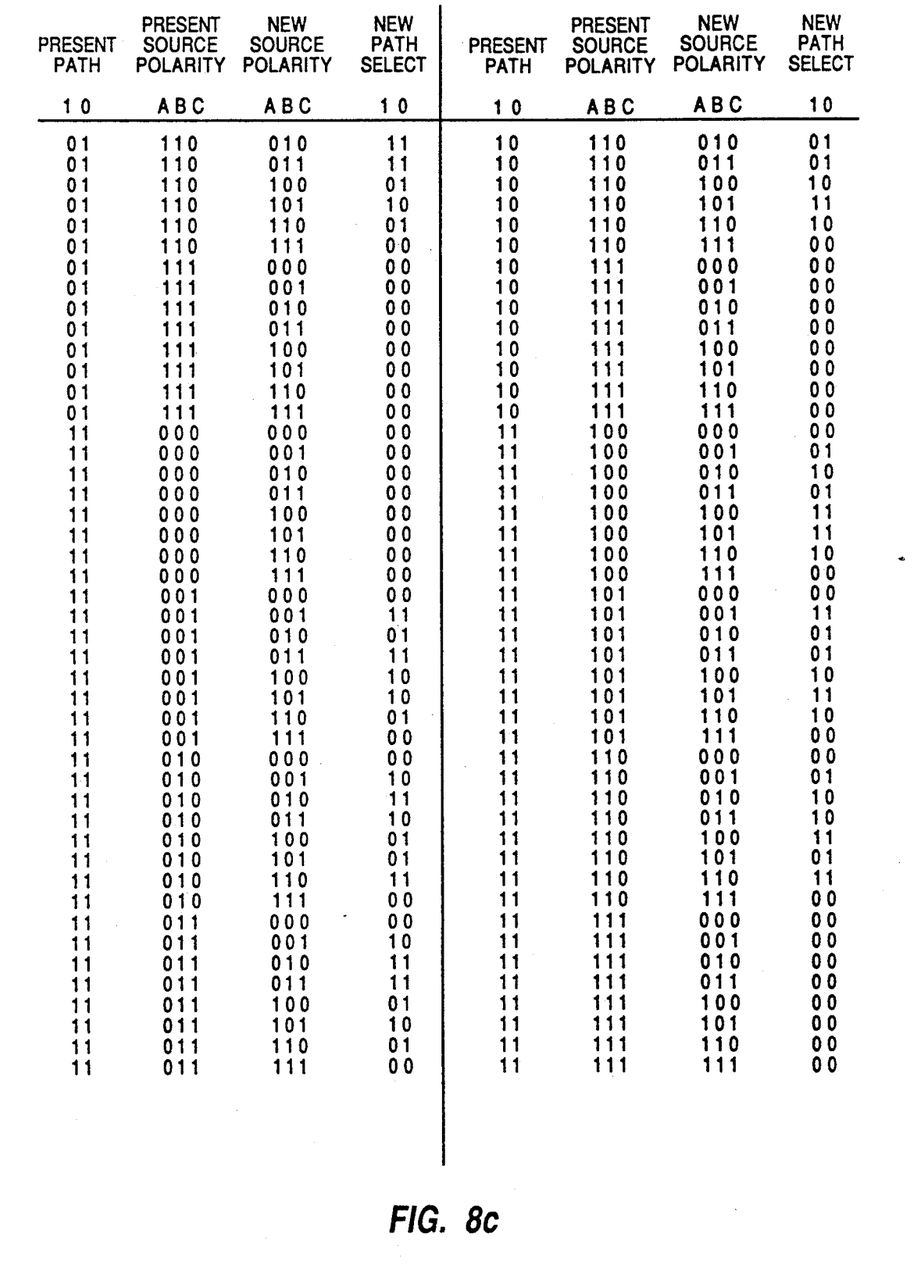

The PROM is programmed to output the lookup table shown in FIG. 7. For six inputs, three from the new power source and three from the load, there are 64 possible values. Each input combination produces a best match as determined by the truth table of FIG. 4a. If the polarities from both sources are used and the present path is included, the lookup table consists of 256 entries (eight inputs). The listing of these values is shown in FIG. 8. The solution is determined by the translation table and truth table in FIGS. 4a and b. The new path decoding (a phase match selection) 80 is represented by: 00 — invalid path; 01 — new source phase A to load phase A, B to B, and C to C; 10 new source phase A to load phase B, B to C, C to A; and 11 — new source phase A to load phase C; B to A, C to B. The polarity lines are represented by 0 for a negative voltage and 1 for a positive voltage. Referring to FIG. 1, the states of phases are represented as follows:

```
0-60 degrees:   A+, B-, C+; state 101.
60-120 degrees: A+, B-, C-; state 100.
120-180 degrees: A+, B+, C-; state 110.
180-240 degrees: A-, B+, C-; state 010.
240-300 degrees: A-, B+, C+; state 011.
300-360 degrees: A-, B-, C+; state 001.
```

Although a specific embodiment of the invention has been disclosed, it will be understood by those having skill in the art that minor changes can be made to the details of the specific embodiment without departing from the spirit and scope of the invention.

What is claimed is:

1. A digital phase match discriminator for matching a first multi-phase power source connected to a load to a second multi-phase power source to be connected to the load by choosing the best phase paths for the second multi-phase power source comprising:

a logic network for monitoring each phase voltage of the second multi-phase source and the load and for producing an output based on the voltage polarities of the phases of the second multi-phase source and the load;

a storage element for receiving an output from the logic network indicative of the best phase path solution between the second multi-phase power source and the load; and said logic network updating the best phase path solution contained in the storage element each time and phase of the load change polarity.

2. The apparatus of claim 1 wherein the multi-phase power sources are three phase.

3. The apparatus of claim 1 wherein a PROM forms a part of the logic network.

4. The apparatus of claim 1 wherein the logic network is formed of exclusive OR and OR gates and provides synchronization of the logic network output.

5. A digital phase match discriminator for matching a first multi-phase power source connected to a load to a second multi-phase power source to be connected to the load by choosing the best phase paths for the second multi-phase power source comprising:

a logic network for monitoring each phase voltage of the first and second multi-phase sources and for producing an output based on the voltage polarities of the phases of the first and second multi-phase sources and the presence path of power from the first power source to the load;

a storage element for receiving an output from the logic network indicative of the best phase path solution between the second multi-phase power source and the load; and said logic network updating the best phase path solution contained in the storage element each time any phase of the first multi-phase source changes polarity.

6. The apparatus of claim 1 wherein the multi-phase power sources are three phase.

7. The apparatus of claim 1 wherein a PROM forms a part of the logic network.

8. The apparatus of claim 1 wherein the logic network is formed of exclusive OR and OR gates and provides synchronization of the logic network output.

9. A method of phase matching a firs multi-phase power source connected to a load to a second multi-phase power source to be sequentially connected to the load to choose the best phase path solution for the second multi-phase power source comprising the steps of:

monitoring the phase voltages of the load and second multi-phase power source;

determining the best phase path solution from a logic network based on the voltage phase polarities of the load and the second source as listed in a truth table;

storing a value from the logic network indicative of the best phase path solution between the second multi-phase source and the load; and updating the stored value each time any phase of the load changes polarity.

10. The method of claim 9 wherein the multi-phase power sources are three phase.

11. The method of claim 9 wherein the output is in synchronization with the first multi-phase power source.

12. A method of phase matching a first multi-phase power source connected to a load to a second multi-phase power source to be sequentially connected to a load by choosing the est set of phase path solutions for the second multi-phase power supply comprising the steps of:

monitoring the phase voltages of the load and the second multi-phase power source;

determining the best phase match from a logic network based on the voltage phase polarities of the first source, second source and the path solutions of the first source to the load as listed in a truth table;

storing a value from the logic network indicative of the best phase match between the second multi-phase power source and the load; and updating the stored value each time any phase of the load changes polarity.

13. The method of claim 12 wherein the multi-phase power sources are three phase.

14. The method of claim 12 wherein the output is in synchronization with the first multi-phase power source.

* * * * *